Jan. 21, 1964   O. W. LIVINGSTON   3,119,054
SYSTEM FOR CONTINUOUSLY POSITIONING FROM INTERMITTENT DATA
Filed March 7, 1960                                4 Sheets-Sheet 2

INVENTOR:
ORRIN W. LIVINGSTON,
BY Melvin M. Goldenberg
HIS ATTORNEY.

Jan. 21, 1964  O. W. LIVINGSTON  3,119,054
SYSTEM FOR CONTINUOUSLY POSITIONING FROM INTERMITTENT DATA
Filed March 7, 1960  4 Sheets-Sheet 3

INVENTOR:
ORRIN W. LIVINGSTON,
BY Melvin M. Goldenberg
HIS ATTORNEY.

United States Patent Office 3,119,054
Patented Jan. 21, 1964

3,119,054
SYSTEM FOR CONTINUOUSLY POSITIONING
FROM INTERMITTENT DATA
Orrin W. Livingston, Waynesboro, Va., assignor to General Electric Company, a corporation of New York
Filed Mar. 7, 1960, Ser. No. 13,206
17 Claims. (Cl. 318—162)

The present invention relates to a system for utilizing information about starting and end points in a position control system to derive signals that modify the velocity along each axis. This assures that substantially a straight line is followed and the correct end point is reached. The invention has particular reference to alternative means for achieving the results of the above systems.

The invention also seeks to provide a control system which permits straight line interpolation between successive points so as to essentially convert an intermittent positioning system to a continuous positioning system.

An object of the invention is to provide an improved system for continuously positioning a machine tool or machine from intermittent data.

Another object of the invention is to provide an improved numerical positioning control system which utilizes relatively inexpensive and conventional components.

Another object of the invention is to provide a continuously positioning system controlled by intermittently fed data that provides accurate movement and control of the relative position between the work and the machine or machine tool.

Another important object of the invention is to provide a system that can be compatibly used with existing selsyn systems and numerical positioning control systems.

The prior art of numerical positioning control systems provides for the automatic control of the motions of a machine or machine tool. These motions may be either linear or rotary. The motions of the machine or machine tool as well as auxiliary functions useful in controlling the machine or machine tool may be fed to the control automatically from any suitable data storage medium such as punched tape or cards or by manual means with decade switches. It is well known that machine motions may also be controlled manually with "jog" buttons. In these machines the motion is continuous and controlled by data fed intermittently to the machine.

It is often convenient in positioning control systems to start at a point with co-ordinates $X_1$ and $Y_1$ and then to proceed in a substantial straight line to a commanded position or point having co-ordinates $X_2$ and $Y_2$, and then finally to proceed to continue along another substantial straight line to a point having co-ordinates $X_3$ and $Y_3$. These positioning control systems further provide the necessary control function by setting the velocity of the X and Y motions, known as $V_X$ and $V_Y$. These are required to produce the motion of the machine or machine tool from $X_1Y_1$ to $X_2Y_2$, and then from $X_2Y_2$ to $X_3Y_3$ under ideal conditions. In these known positioning control systems slight errors in setting the velocity of the X and Y motions, errors in amplifier drift that is characteristic of such equipment, and errors responsive to load reaction, or in temperature drift of components, are found to cause the positioned member of the machine or machine tool to reach $X_2$, for example, before it reaches $Y_2$, or vice versa. Under the above condition the motion that has attained its objective ceases and permits the complimentary motion to continue until it has reached its objective. Then and not until then, is it possible to continue on in another substantially straight line to $X_3Y_3$. It has been found that this operation corrects the drift error in a concentrated "jog" near $X_2Y_2$ that is undesirable in control systems wherein the machine tool may be cutting or contouring the work. In any event, however, it is essential to make the correction at or near $X_2Y_2$ before the second line starts at $X_2Y_2$, which in the absence thereof would result in an accumulation of drift errors where a series of such lines were described by the machine or machine tool.

Accordingly, the present invention is directed to a continuous positioning control system that overcomes the difficulty of correcting drift error by a concentrated "jog" as described above by continuous corrections for such drift errors throughout each straight line so that the co-ordinates of each successive point are attained essentially simultaneously.

The above and other objects and advantages of the invention will become apparent upon full consideration of the following detailed description and accompanying drawings in which:

FIGURE 5b is a chart of the operation of the converter shown in FIGURE 5a;

Figure 1:
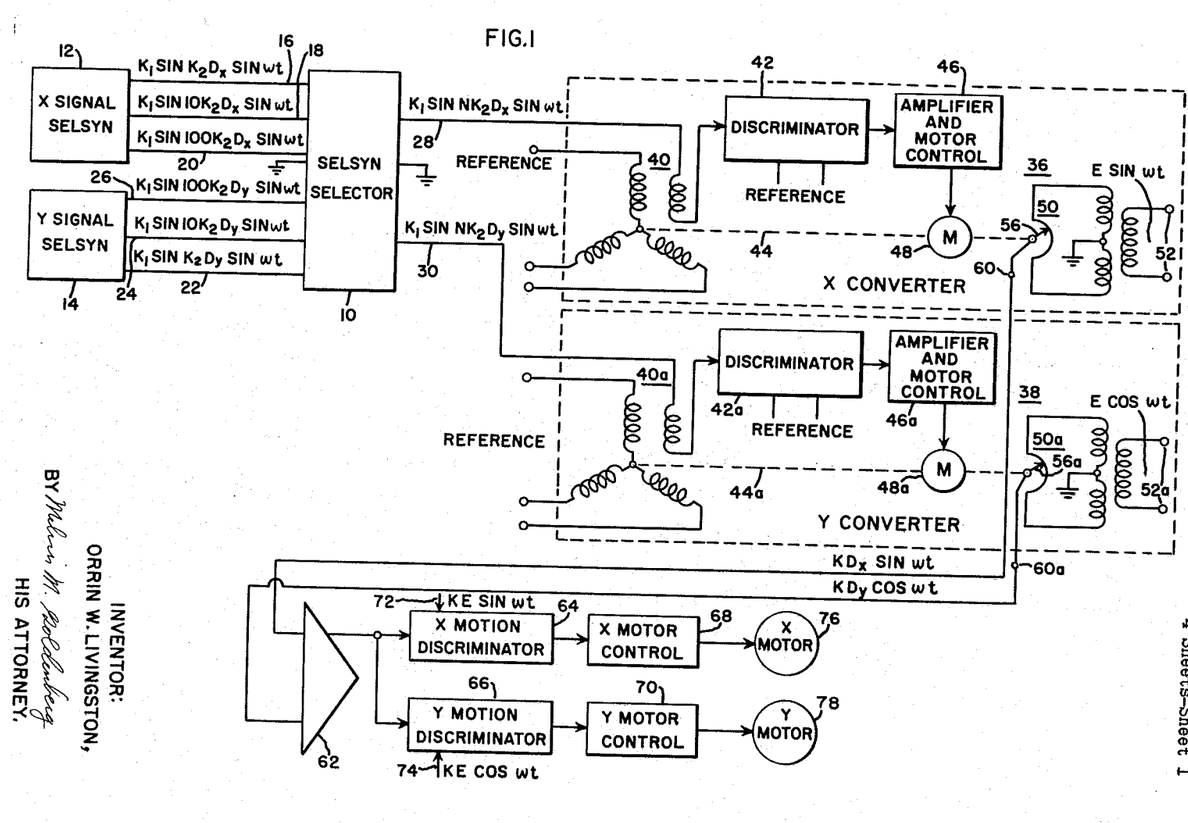
FIGURE 1 is a schematic and block diagram of one embodiment of a continuous positioning control system using straight line interpolation of intermittent supplied data using the principle of the homing system in accordance with a preferred embodiment of the present invention.

Referring now to the figures the same reference numerals are used throughout to refer to the same elements. In FIGURE 1 there is shown a selsyn selector 10 having inputs from a plurality of X signal selsyns 12 and Y signal selsyns 14 of a positioning system for providing instantaneous position information to control a machine or machine tool. The details of the X and Y signal or machine tool. The details of the X and Y signal selsyns of the positioning system are not shown but, as is well known, they may be a set of three selsyns for providing coarse information, intermediate information, and fine information.

In the set of X signal selsyns, the output of the coarse signal selsyn plus an interpolating voltage is applied to an input terminal 16 of the selsyn selector 10. The coarse signal applied to terminal 16 is an A.C. voltage of selsyn frequency which may be for example 400 cycles and has an amplitude which is proportional to the sin of $K_2(X_2-X)$ or $K_2D_X$. In a corresponding manner the intermediate signal selsyn provides an output which is fed to the selsyn selector 10 together with an interpolating voltage applied between an input terminal 18 and ground. The amplitude of this intermediate information is proportional to the sin of $10K_2D_X$ where the gearing between the intermediate information and the coarse information is in the ratio of 10:1. This is accomplished by any appropriate, well-known gearing arrangement (not shown). The connection of the fine signal selsyn with its interpolating voltage is applied between the input terminal 20 and ground of the selsyn selector and is also an A.C. voltage of selsyn frequency having its amplitude proportional to the sin of $100K_2D_X$ where a gear ratio of 10:1 appears between the fine signal selsyn and the intermediate signal selsyn.

Within the selsyn selector 10 there are voltage sensing circuits similar to standard error monitoring circuits of conventional equipment. These circuits during control operation include a discriminator error monitoring relay that picks up at a value of discriminator output voltage and then drops out as the voltage is reduced towards a zero value. The region between a plus and minus dropout voltage is the so-called "deadband" and is large enough so that the relay will always drop out when a positioning motor ceases to be driven, but small enough so that desired positioning accuracy is obtained. A normal setting is +1.5 volts. The voltage sensing circuit of the selsyn selector 10 determines whether either of the X or Y coarse signal selsyns has a voltage that is higher than a preset value which, for example, might be five to ten percent of the maximum. If either of the X or Y coarse signal selsyns has a voltage higher than the preset value, both coarse signal selsyns are switched to the output terminals 28, 30 for immediate use. By appropriate and suitable interlocking arrangements in the selsyn selector, the other selsyns applied to the input terminals 18, 20, 24 and 26 of the selsyn selector remain disconnected regardless of the amplitude of their outputs.

Where it is apparent to the selsyn selector 10 that the distance between $X_1Y_1$ and $X_2Y_2$ is comparatively large, then both X and Y coarse signal selsyns are switched to the output terminals as above described and the positioning motor of the machine or machine tool proceeds toward point $X_2Y_2$ in a manner to be described below. As the machine or machine tool progresses, the distances yet to be traversed, i.e., $D_X$ and $D_Y$ become smaller so that the signals from the output of the X and Y coarse signal selsyns decrease. As soon as the larger output of the X and Y coarse voltage signal selsyns falls below the preset level of the voltage sensing circuit, both coarse signal selsyns are disconnected from the output terminals 28, 30 of the selsyn selector and both X and Y intermediate signal selsyns are connected to the output terminals thereof. These X and Y intermediate signal selsyns are connected when at least the output of one of them is greater than the preset value. As the larger output of the intermediate signal selsyns falls below the preset level of the voltage sensing circuit, the selsyn selector progresses further to switch out the connection of the intermediate signal selsyns from the output terminals 28, 30. As this larger output falls below the preset value, the intermediate signal selsyns are both disconnected, and the fine signal selsyns are connected to the output terminals 28, 30.

Finally when the largest signal from the fine signal selsyns falls below a preset value, the machine or machine tool is determined to have arrived at a point $Y_2X_2$ and this determination have been made, now initiates the transfer of the excitation of the signal selsyns to the next points $X_3Y_3$. The entire sequence of selection of signal selsyns is repeated until the machine or machine tool arrives at the point $X_3Y_3$. The arrival thereat initiates the transfer to subsequent points and the sequence is thus repeated.

It is apparent that a predetermined appropriate pair of X and Y signal selsyns with outputs proportional to $K_1 \sin NK_2D_X$ and $K_1 \sin NK_2D_Y$, respectively are supplied at the terminals 28, 30. It is found to be desirable to have the ratio of the component velocities $V_X$ to $V_Y$ equal to the ratio of $D_X$ to $D_Y$, rather than being equal to the sin function thereof. For small angles, such as angles less than 30°, the sin function is nearly proportional to the magnitude of the angle. However it is of advantage to be able to work with larger angles, for example, in the order of magnitude approaching 90°, to increase the accuracy of the positioning of an object from intermittent data. Therefore for large angles it is desirable to convert sin X to X.

FIGURE 1 further shows an X converter 36 for converting sin X to X. The selected signal from the plurality of signal selsyns as selected by the selsyn selector 10 is applied between terminals 28, 30 and ground to the input terminals of X and Y converters 36, 38. A local selsyn 40 has its output voltage connected in series with the terminal 28 so that the resultant between the output voltage of the signal selsyn 12 and the local selsyn is fed to a discriminator 42. The excitation of the local selsyn is of the same phase as the signal selsyn and the level of excitation is such that the maximum rotor voltage is equal to the maximum rotor voltage of the signal selsyn. The output of the discriminator 42 is fed to an amplifier and motor control 46 to drive a motor 48. A shaft 44 of the local selsyn is coupled directly to the shaft of the motor 48. If the resultant voltage on the discriminator 42 which is correspondingly excited in the same phase as the signal selsyn and the local selsyn, is not zero, it is found that the motor 48 rotates and repositions the local selsyn so that the output thereof is exactly equal and opposite in phase to that of the signal selsyn. Since the output of the local selsyn 40 is proportional to the sin of the angle of rotation of its shaft 44, the resultant rotation of the shaft from the zero output position of the local selsyn is proportional to the distance $D_X$. Similarly, $D_Y$ is obtained in the same way as shown by reference to elements 40a to 48a.

It is of further advantage to obtain the component velocities $V_X$ and $V_Y$. One simple method is shown in FIGURE 1 wherein a potentiometer 50 is shown connected to the "distance" shaft 44. The potentiometer is electrically excited from a source applied to terminals 52 of an A.C. voltage. The slider contact 56 on the potentiometer 50 is so adjusted by the shaft 44 that when the output of the local selsyn affected by the signal selsyn is zero, the output voltage of the potentiometer at terminals 60 is also zero. The amplitude of the output voltage from the potentiometer applied to terminal 60 is proportional to the distance $D_X$. In a corresponding manner a potentiometer 50a is similarly connected to the Y motion shaft 44a, but the potentiometer 50a is excited from a source applied to terminals 52a of an equal voltage displaced at 90° to the voltage applied to the potentiometer 50. This results in two voltages developed at terminals 60, 60a each having the same factor of proportionality with $D_X$ and $D_Y$ but having the phase thereof displaced 90 degrees. The vector sum of these two voltages indicates the resultant direction and relative values of the velocity components at which the machine or machine tool is to be driven.

The resultant voltages of the potentiometers may be amplified by amplifier 62 and converted into a square wave by clipping if desired, as is well known, so that the phase is readily discernable, since it is the phase that is the important consideration of the information derived from the potentiometers. The voltages from the amplifier are applied to X and Y motion discriminators 64, 66 which operate relative to quadrature reference voltages applied to terminals 72 and 74 and may be similar to those used in two dimension tracer control systems. The X and Y D.C. motor control systems 68, 70 drive the X and Y positioning motors 76, 78 from point $X_1Y_1$ to $X_2Y_2$ and subsequent co-ordinate points. The resultant speed may be adjusted by potentiometers in the X and Y D.C. motor drive or control systems 68, 70 or by simultaneously changing the amplitude of the reference voltages applied to reference input terminals 72, 74 of the two discriminators 64, 66. Obviously, either of these speed control functions could be set by information on a card or tape.

The system which has been described may be referred to as a "homing system." Variations are suggested below in the method of obtaining the varying phase signals indicative of the desired direction suitable for feeding to the X and Y motion discriminators.

Figure 2:
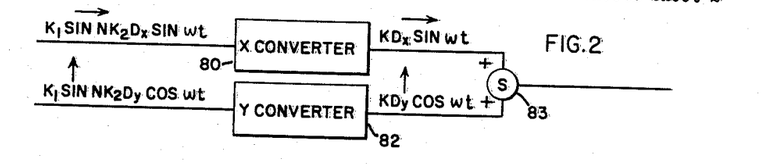
FIGURE 2 is a block diagram of a non-servo distance measurement arrangement for converting an input carrier signal having its amplitude proportional to a sine function to an identically phased output carrier having its amplitude proportional to the angle in accordance with the present invention.
Figure 4:
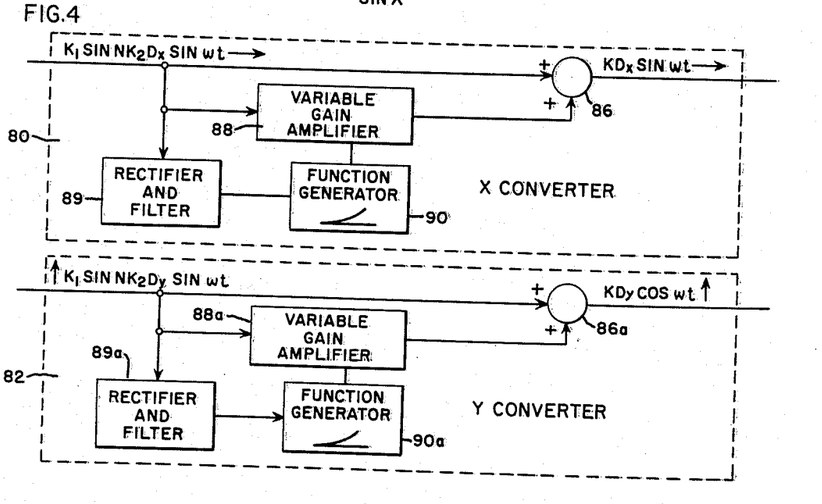
FIGURES 4 and 5a are block diagrams of other embodiments of converters used in FIGURE 2 in accordance with the present invention.
Figure 5A:
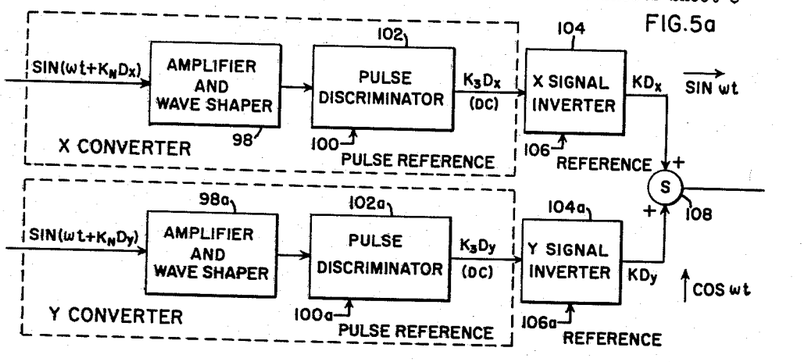

FIGURE 2 is a block diagram common to a number of electronic distance measuring arrangements as shown in detail in FIGURES 4 and 5a which operate without using any servos. In this case while a single phase selsyn system is contemplated, the sin wave excitation of the X and Y signal selsyns applied to converters 80, 82 is displaced 90 degrees, that is, the Y signal selsyns are excited in quadrature with respect to the X signal selsyns. The converters, which will be described in detail below, may have a number of variations, but all have the property of converting an input signal, $K_1 \sin NK_2D_X \sin \omega t$, into an output $K_XD_X \sin \omega t$. Stated in other words, an input carrier frequency having an amplitude proportional to the sin of an angle is converted to an identically phased output carrier, the amplitude of which is proportional to the angle. The outputs of the converters are voltage vectors at right angles to each other and are then combined in a summing device 83 to form a resultant voltage, the phase of which is indicative of the proper direction to "steer" the machine from $X_1Y_1$ to $X_2Y_2$, etc. This resultant voltage after amplification and "clipping," if necessary, can now be used as shown in FIGURE 1 to feed the X and Y discriminators 64 and 66 so as to obtain correct motor operation.

Figure 3:
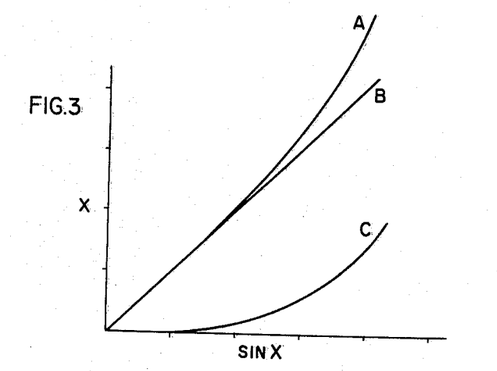
FIGURE 3 is a plot of the desired output X, as a function of the input sin X, useful in the present invention.

In FIGURE 3, curve A shows the desired output of converters 80 and 82 as a function of the input. It is noted that the variation of curve A from curve B, which is a straight line, is not very great at the lower values of input. Indeed, it is conceivable that by the proper setting of the circuits of the selsyn selector 10 to limit the use of the signal selsyns to the lower output voltage region of their characteristics, no signal modification other than amplification might be required of converters 80 and 82. However, if more accuracy is required, it may be desired to follow more closely the characteristic of curve A as obtained, for example, by the circuit of FIGURE 4.

FIGURE 4 shows a block diagram of one type of circuit for obtaining a characteristic corresponding to curve A. It will be seen that the original position signal $K_1 \sin NK_2D_X \sin \omega t$ has added to it in a summing device 86 a contribution from a variable gain amplifier 88. This is in effect adding a correction factor as shown in curve C of FIGURE 3 to the original signal, curve B, to obtain curve A at the output of the summing device 86. One manner to control the gain of the variable gain amplifier is to rectify and filter the input by rectifier and filter 89 and apply it to a function generator 90 including a conventional wave shaping circuit using non-linear elements such as thyrite or rectifiers and resistors. The function generator gives a suitably rising characteristic with increased signal amplitude to obtain the output-input relationship for the variable gain amplifier as shown in curve C of FIGURE 3. It should be noted that the rectifier and filter have an effect of averaging the input over several cycles so that rapid changes of gain during the cycle do not occur thereby avoiding wave shape distortion. While this may produce some undesirable time delay, it should be noted that this time delay is only inflicted on the small correction component of the output, and the major portion of the output response is not delayed. The components of the Y converter 82 are provided by elements 86a to 90a as was described by elements 86 to 90 for the X converter 80.

The variable gain amplifier 88 itself may be of the vacuum tube type using variable mu tubes or might use transistors or even non-linear capacitors. Other configurations of converters 80, 82 are also possible.

While the selsyn system for intermittent positioning control as shown in FIGURE 1 uses single phase selsyns, it is quite possible to modify it to provide a polyphase selsyn excitation system. In this case command digit voltages are derived from taps on a polyphase transformer and less significant digits are obtained by interpolation between successive taps. Such a selsyn system is useful in connection with the "homing system" since the output of any selsyn is now essentially constant in amplitude, but is phase displaced from a zero position by an angle which is proportional to the distance to be traversed. This makes possible certain simplifications as will be shown.

Figure 5B:
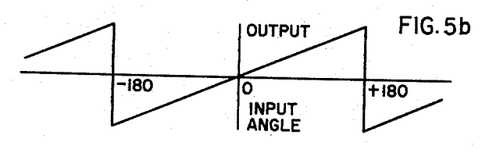

FIGURE 5a shows a block diagram of the unique elements of a "homing system" using phase selsyns to supply the input signals which have phase displacements corresponding to the input data. As shown, the input signals are constant amplitude A.C. signals which are phase displaced from a reference phase by angles $K_ND_X$ and $K_ND_Y$ respectively. These signals may be amplified, squared, and differentiated by well-known circuit means 98, 98a to convert them to signal pulses. They are fed together with reference pulses applied to input terminals 100, 100a to pulse type discriminators 102, 102a having a straight line characteristic as shown in FIGURE 5b from −180 degrees to +180 degrees. Alternatively a standard discriminator may be used similar to conventional two dimensional tracer discriminators, but with a square wave reference supply. These would also give the desired straight line characteristic relationship, but only from −90 degrees to +90 degrees.

The outputs of the discriminators 102, 102a are D.C. signals which may require some filtering, but having an average value proportional to $D_X$ and $D_Y$ respectively. These D.C. signals are next fed to X and Y signal inverters 104, 104a which have respective 90° displaced reference inputs applied to terminals 106, 106a. The A.C. outputs of inverters 104, 104a have quadrature phase as determined by the reference inputs correspondingly phased, and amplitude proportional to the D.C. input signals supplied by the discriminator 102, 102a. The two A.C. signals from the two signal inverters 104, 104a are added in a summer 108 to produce an A.C. voltage having its phase indicative of the direction of motion required. As in the previous arrangements shown, the A.C. signals are fed to two motion discriminators and motor controls, such as is also shown in FIGURE 1.

Figure 6:
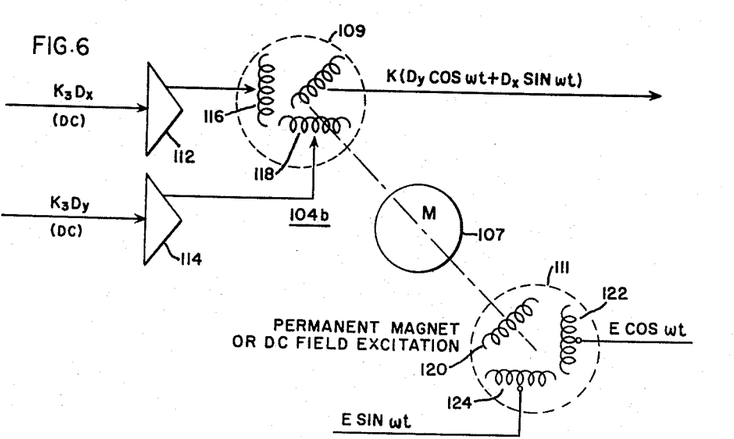
FIGURE 6 shows details of another embodiment of an inverter that may be used in the present invention.

FIGURE 6 shows a rotating type signal inverter suitable for use as the inverters 104, 104a. A small non-synchronous motor 107 may be used to drive generators 109 and 111 which both have quadrature windings on either the stationary or the rotating members, and single phase windings on the other member. After the D.C. signals from discriminators 102, 102a are amplified in amplifiers 112, 114, if necessary, they are fed to the two quadrature windings 116, 118 of generator 109, and produce a stationary D.C. field, the angle of which is determined by the amplitude and sense of its two components. As the rotating member is turned, it produces an output A.C. voltage, the phase of which varies with respect to the two quadrature output voltages of generator 111 as the angle of the resultant D.C. field of generator 109 changes as a function of the D.C. input signals. The rotating single phase winding 120 of generator 111 may be excited with a fixed D.C. or the excitation may be supplied by a permanent magnet.

The output of generator 109 is now a varying phase A.C. signal to feed the discriminators such as shown in FIGURE 1 wherein their reference voltages are derived from the quadrature outputs 122, 124 of generator 111. Using the two generators 109, 111 as shown, the motor 106 does not have to be of the synchronous type and indeed the frequency of these discriminator voltages are quite independent of the selsyn frequency. If desired, however a synchronous motor might be used and generator 111 omitted, since the discriminator reference signals then could be obtained from the supply system, but the supply system in this case should be quite stable, or "hunting" of the synchronous motor would then produce errors.

Figure 7:
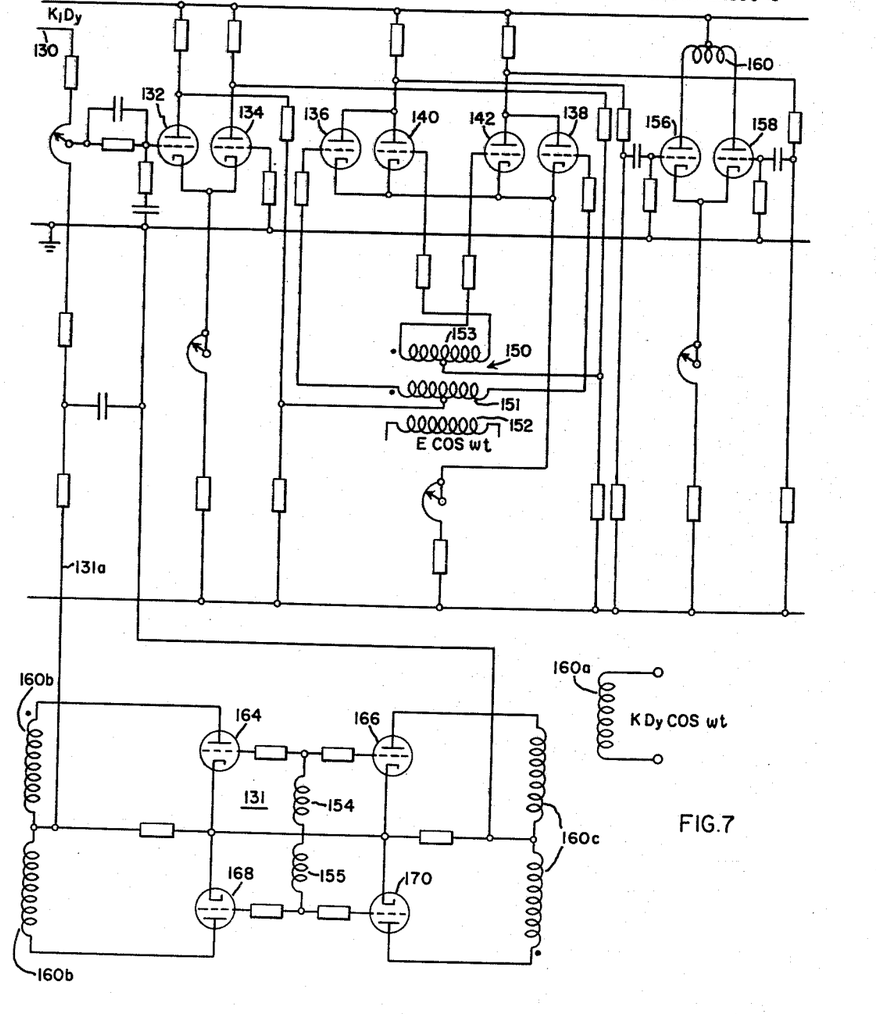
FIGURE 7 is a circuit diagram of a further embodiment of an electronic type signal inverter.

An all electronic type signal inverter which can be used for inverters 104, 104a is shown in FIGURE 7. In this circuit the input D.C. signal $K_3D_Y$ is applied at terminal 130 and compared with the output signal furnished by a discriminator 131 over conductor 131a. If there is a voltage error in either direction, the resulting difference voltage is effective after amplification by the tubes 132 and 134 to control the gain of a circuit for supplying an A.C. signal whose amplitude is proportional to the D.C. input. The amplifier difference signals from tubes 132 and 134 are connected to the center taps of secondaries 151, 153 of transformer 150 either to more positively bias the grids of variable mu triode tubes 136 and 138 and more negatively bias the grids of variable mu triode tubes 140 and 142, or vice versa. These two triode tubes 136, 138 receive A.C. grid signals from the secondary 151 of transformer 150 and tubes 140, 142 receive A.C. signals from secondary 153. The transformer 150 is excited from the reference frequency $E \cos \omega t$ applied to primary 152 which determines the output phase of the secondaries. It will be seen that the output of tubes 136 and 138 is of opposite phase to the output of tubes 140 and 142. Thus, if $K_1D_Y$ is a positive D.C. signal, it is found by tracing through the circuit that tubes 140 and 142 will actually dominate, and set the phase of the output signal which is applied to tubes 156, 158. For this condition a negative feedback signal is developed on lead 131a which is subtracted from the input signal and is used effective to vary the gain of the tubes 136, 138 and 140, 142 as described above. The sense of the change is such that the gain of the tubes 140, 142 is reduced by making their D.C. grid bias more negative, and the gain of the tubes 136, 138 is increased by making their bias less negative until the output signal from tubes 156, 158 has the correct value to produce a D.C. signal on lead 131a which subtracts from the voltage on the terminal 130 so that the difference to the grid of the tube 13 has the correct value. If on the other hand $K_1D_Y$ had been a negative D.C. signal, tubes 136 and 138 would prevail causing the sense of the A.C. output from tubes 156, 158 to be reversed.

Tubes 156 and 158 are a capacity coupled output stage for exciting a transformer primary 160 which has an output secondary winding 160a as well as two secondaries 160b and 160c supplying the discriminator 131 which employs triodes 164, 166, 168, 170. The discriminator 131 has grid signals applied to tubes 164, 166 from secondary 154 of transformer 150 and opposite phase grid signals applied to tubes 168, 170 from secondary 155 of transformer 150. The discriminator 131 thus produces a D.C. output on lead 131a which has a polarity in accordance with the relative phase of the A.C. signals applied to windings 152 and 160. The operation of the closed loop feedback circuit of FIGURE 7 produces an A.C. output signal $KD_Y \cos \omega t$ at the secondary 160a, corresponding to the excitation of primary 160 which can be applied to a summer 108 (see FIG. 5a) together with a signal $KD_X \sin \omega t$ derived from a circuit similar to FIGURE 7 for the X component of displacement.

While the system of FIGURE 1 has indicated only three selsyn speeds, it is obvious that any number may be used. Although a separate voltage sensing circuit for each signal selsyn has been disclosed it would be possible to use only two, switching them progressively to the higher speed selsyns when the next lower order of speed selsyns are switched out from the output circuit.

While the preferred embodiment of the invention is concerned with single phase selsyn systems, polyphase excited selsyn systems with some modification in the selsyn selector logic are also within the contemplation of the invention. In this case the selsyn signal has a constant amplitude but variable phase. Instead of a voltage sesitive switching circuit, phase discriminators would be used, which, as their output falls off, will cause a transfer to the next higher speed selsyn in much the same manner as described for the single phase selsyn selector system.

The "homing system" may be applied to any type numerical positioning control system including digital, and may be fed from a tape or card feed system using selsyn positioning indicators.

A double storage data system may be used so that transition from one data point to the next can be accomplished in a few milliseconds without a reading delay so that the positioned body does not have to stop at the successive co-ordinate stations. Starting from $X_1Y_1$, a series of selsyns ranging from coarse to fine are properly excited so that they will all indicate zero at $X_2Y_2$.

The basic principles of a "homing system" have been disclosed which provide continuous positioning systems capable of straight line interpolation between successive co-ordinate points. Machines controlled by the system have the property of passing through all coordinate stations without drift or abrupt intermittent corrections.

The basic system principles are broadly applicable to digital systems as well as to the analog system described and illustrated herein.

From the above description, it will be apparent that a system for continuously positioning a machine or machine tool from intermittent data in accordance with the invention is easily accomplished using conventional components that provide a high degree of accuracy. The continuous positioning system of the invention is compatible with conventional selsyn systems, and may be used in cooperation with such selysn systems. While the invention has been described with reference to these particular embodiments, it is to be understood that many modifications may be made by persons skilled in the art without departing from the spirit of the present invention. Accordingly, reference should be made to the following claims in determining the full scope of the invention.

What is claimed as new and is desired to be secured by Letters Patent of the United States is:

1. In a position control system in which intermittent position data is fed to derive continuous movement of a machine, a local selsyn having a reference excitation, an output and a rotating shaft, a discriminator for comparing the output of the local selsyn with an output coupled from a signal selsyn excited with the reference excitation, the discriminator also being commonly excited with the reference excitation, a motor mounted in common with the rotating shaft and driven by the output of the discriminator to rotate and reposition the local selsyn, said rotation and repositioning producing an output of the local selsyn equal and opposite in phase to the output received from the signal selsyn, said output of the signal selsyn being proportional to a trigonometric function of the distance between a commanded position and an instantaneous position, and the resultant rotation of the shaft being proportional to said distance.

2. A servo system controlled by intermittent position data to derive continuous control of a machine that moves between the co-ordinate points comprising first and second servo arrangements each including a local selsyn having a reference excitation, an output and a rotating shaft, a discriminator for comparing the output of the local selsyn with an output coupled from a signal selsyn, the discriminator also being excited in common with the local selsyn, a motor mounted in common with the rotating shaft and energized for rotating by the output of the discriminator to rotate and reposition the local selsyn, said rotation and repositioning producing an output of the local selsyn equal and opposite in phase to the output received from the signal selsyn, said output of the signal selsyn being proportional to a trigonometric function of the distance between a commanded position and an instantaneous position, and the rotation of the shaft being proportional to the said distance, said first servo for controlling one component of the resulting distance, a second servo for controlling a second component of the resulting distance, a potentiometer excited by a first separate A.C.

voltage having a slider rotatable by the first shaft, a second potentiometer excited by a second separate A.C. voltage of a phase related to the phase of the first separate A.C. voltage in the same manner as the second component of the resulting distance is related to the first component, and outputs derived from each of the potentiometers, the outputs being proportional to the relative velocities of the machine motion.

3. The servo system of claim 2 wherein the outputs derived from the potentiometers are coupled to component direction motors for providing motion to the machine as it moves between the co-ordinate points.

4. The servo system of claim 2 wherein the first and second separate A.C. voltages are displaced by 90° from each other.

5. A servo system controlled by intermittent position data by which it is desired that a machine move in a continuous manner, said data being in the form of a trigonometric function of the distance between a commanded position and an instantaneous position comprising a local selsyn having a reference excitation, an output and a rotating shaft, a discriminator for comparing the output of the local selsyn with the data of the trigonometric function, the discriminator also being excited in common with the local selsyn, and a motor coupled to the output of the discriminator, mounted in common with the rotating shaft, and energized for rotation by the output of the discriminator to rotate and reposition shaft of the local selsyn, said rotation and repositioning producing an output of the local selsyn being equal and opposite in phase to the data of the trigonometric function, the rotation of the shaft being proportional to said distance.

6. A servo system controlled by intermittent position data from which a machine may move in continuous manner, said data being in the form of a trigonometric function of the distance between a commanded position and an instantaneous position, comprising a local selsyn having a reference excitation, an output and a rotating shaft, a discriminator for comparing the output of the local selsyn with the data of the trigonometric function, the discriminator also being excited in common with the local selsyn, and a motor coupled to the output of the discriminator, mounted in common with the rotating shaft, and energized for rotation by the output of the discriminator to rotate and reposition the shaft of the local selsyn, said rotation and reposition producing an output of the local selsyn being equal and opposite in phase to the data of the trigonometric function, the rotation of the shaft being proportional to said distance, and means for deriving resultant velocity data from said shaft to drive the machine from its instantaneous position to the commanded position.

7. Apparatus for continuously positioning a machine from intermittent data comprising selector means for receiving sets of input signals relative to motion in at least two axes, each set of input signals containing information of at least coarse and fine data, said selector means sensing whether the coarse data exceeds a preset value and switching the coarse data signals to the output thereof and disconnecting the fine data signals from the output, said selector means connecting said fine data signals applied to the input of the sets to the output thereof when the coarse data signals of all sets fall below said preset level, a local selsyn for each axis and with the same excitation phase and amplitude as the excitation of the input signals, the output of said local selsyn coupled in series with its associated output of the selector means, discriminators excited in the same phase and amplitude as the local selsyn and receiving as an input said local selsyn output and said associated output motor control means for each set coupled to the output of the discriminator of its axis, a motor for each axis coupled to said local selsyn of its axis, said motor being controlled by the output of the motor control means thus indicating the distance to the next co-ordinate point.

8. Apparatus for continuously positioning a machine from intermittent data comprising selector means for receiving sets of input signals relative to motion in at least two axes, each set of input signals containing information of at least coarse and fine data, said selector means sensing whether the coarse data exceeds a preset value and switching the coarse data to the output of the selector means and disconnecting the fine data from the output, said selector means disconnecting from the output all coarse data signals applied to the input when the coarse data of all inputs falls below said preset level and concurrently connecting the fine data signals applied to the input to the output, a local selsyn for each axis having its excitation phase and amplitude the same as the excitation of the input, the output said local selsyn coupled in series with its associated output of selector means, a discriminator for each axis excited in same phase and amplitude as local selsyn and receiving as an input said local selsyn output and said associated output from the output of each discriminator, a motor for each axis coupled to the local selsyn, each said motor being controlled by the output of the motor control means, a potentiometer for each axis adapted to be varied by rotation of a shaft, said shaft being coupled to said motor shaft, said potentiometers being excited by an A.C. source, and means for deriving vector outputs from said potentiometers with respect to the phase of the A.C. source that is proportional to the direction and velocity at which the machine is to be continuously driven by said intermittent data.

9. Apparatus for continuously positioning a machine from intermittent data comprising selector means for receiving sets of input signals relative to motion in at least two axes, each set of signals containing information of at least coarse and fine data, said selector means sensing whether the coarse data exceeds a preset value and for switching the coarse data to the output thereof and disconnecting the fine data from the output, said selector means disconnecting from the output all coarse data applied to the input when the coarse data of all inputs fall below said preset level and concurrently connecting fine data of the input to the output, said sensing means further disconnecting from the output all fine data applied to the input when the fine data of all sets of signals fall below a preset level, a local selsyn for each axis having a shaft and an excitation phase and amplitude corresponding to the excitation of the input signals, and having its output coupled in series with the output of the selector means, a discriminator for each axis excited in the same phase and amplitude as the excitation of the local selsyn to produce a voltage responsive to the difference of the input signal and the local selsyn, and amplifier and motor control means coupled to the output of the discriminator, a motor for each axis having its shaft coupled to the shaft of the local selsyn, each said motor being controlled by the output of its associated amplifier and motor control means, a potentiometer for each axis having its output varied by rotation of the shaft, said potentiometer being excited by an A.C. source, and means for deriving outputs from the potentiometers with respect to the phase of the A.C. source that is proportional to the direction and velocity at which the machine is to be continuously driven by said intermittent data.

10. In a servo system controlled by intermittent data of co-ordinates of successive points of a desired path including position indicating means adapted to be coupled to the positioned member and producing output signals which are a trigonometric function of the distance between a commanded position and an instantaneous position, the improvement comprising, selection means to determine which of said output signals of each axis is above a predetermined level and to render effective the same order of output signals for all axes corresponding to coarsest level of the output signals for any axis that exceeds the predetermined level and rendering effective successively more sensitive orders of positioning signals as said distance decreases, and means for converting said output trigonometric function signals into signals representing a linear indication of said distance.

11. In a servo system controlled by intermittent data of co-ordinates of successive points of a desired path including position indicating means adapted to be coupled to the positioned member and producing output signals which are a trigonometric function of the distance between a commanded position and an instantaneous position, the improvement comprising, selection means to determine which of said output signals of each axis is above a predetermined level and to render effective the same order of output signals for all axes corresponding to coarsest level of the output signals for any axis that exceeds the predetermined level and rendering effective successively more sensitive orders of positioning signals as said distance decreases, means for converting said output trigonometric function signals into signals representing a linear indication of said distance, means for developing a direction indicating signal as a function of the ratio of the linear indication signals for each axis, and means utilizing the direction indicating signals to determine the relative velocity of co-ordinate position devices associated with axis.

12. In a servo controlled by intermittent data of co-ordinates of successive points of a desired path including position indicating means adapted to be coupled to the positioned member and producing output signals which are a trigonometric function of the distance between a commanded position and an instantaneous position, the improvement comprising selection means to determine which of said output signals of each axis is above a predetermined level and to render effective the same order of output signals for all axes corresponding to coarsest level of the output signals for any axis that exceeds the predetermined level and rendering effective successively more sensitive order of positioning signals as said distance decreases, means for converting said output trigonometric function signals into signals representing a linear indication of said distance, means for developing a direction indicating signal as a function of the ratio of the linear indication signal, means for each axis means utilizing the direction indicating signals to determine the relative velocity of co-ordinate position devices associated with axis, and means to control the absolute velocity of the positioning devices.

13. A positioning system controlled by intermittent position data to enable a machine to move continuously to a commanded position from an instantaneous position, said data being in the form of trigonometric functions of the distances in at least two axes between the commanded position and the instantaneous position, comprising converters for translating the trigonometric functions into linear functions of said distances, one of said converters including a variable gain amplifier having an input to receive one trigonometric function, a summing device responsive to said one trigonometric function and the output of the variable gain amplifier, means for rectifying said one trigonometric function, a function generator coupled to said rectifier means for producing a non-linear control upon the variable gain amplifier, and means deriving an output of the summing device that is a function of said distance.

14. A positioning system controlled by intermittent position data to enable a machine to move continuously to a commanded position from an instantaneous position, said data being in the form of trigonometric functions of the distances in at least two axes between the commanded position and the instantaneous position, comprising converters for translating the trigonometric functions into linear functions of said distances, one of said converters including a wave shaper for producing pulses from A.C. signals being phase displaced from a reference phase by angles proportional to said distance, and a discriminator responsive to the pulses of the wave shaper and a reference pulse source for producing a D.C. signal related to said distance, and signal inverting means for producing A.C. signals whose phase is displaced with respect to an A.C. reference signal by an amount proportional to the D.C. signal.

15. A positioning system controlled by intermittent position data to enable a machine to move continuously to a commanded position from an instantaneous position, said data being in the form of trigonometric functions of the distances in at least two axes between the commanded position and the instantaneous position, comprising converters for translating the trigonometric functions into linear functions of said distances, said converters producing signals related to components of said distance, and a summer for combining the two signals to produce an A.C. voltage, the phase of which is indicative of the resulting direction for the motion of the machine.

16. The positioning system of claim 14 wherein the signal inverting means includes a generator having a shaft, quadrature windings and single phase windings, one set of windings being rotary and the other set being stationary, means applying the D.C. signals from said converter to a pair of the quadrature windings, a motor mounted on the shaft to continuously drive the shaft, a second generator having quadrature windings and single phase windings, one of which has a D.C. field source of excitation, and the other set of windings supplying a pair of reference voltages 90° shifted in phase to each other, and an output A.C. voltage of the first generator, the phase of which varies with respect to the two quadrature output voltages of the second generator as the D.C. signals applied to the first generator affect the output A.C. voltage to indicate said distance.

17. The positioning system of claim 14 wherein the signal inverting means is a circuit arrangement including means for comparing a D.C. input signal with a discriminated output signal, phase and amplitude sensitive amplifiers to determine the error of the output signal, and a set of amplifiers having their gain controlled in accordance with the phase and amplitude sensitive amplifiers, said output signal being indicative of said distance.

References Cited in the file of this patent
UNITED STATES PATENTS

| | | |
|---|---|---|
| 2,446,532 | Edwards | Aug. 10, 1948 |
| 2,784,359 | Kamm | Mar. 5, 1957 |
| 2,950,427 | Tripp | Aug. 23, 1960 |

UNITED STATES PATENT OFFICE
CERTIFICATE OF CORRECTION

Patent No. 3,119,054

January 21, 1964

Orrin W. Livingston

It is hereby certified that error appears in the above numbered patent requiring correction and that the said Letters Patent should read as corrected below.

Column 3, line 14, for "+" read -- $\pm$ --; line 54, for "have" read -- having --; column 4, line 30, for "potientiometer" read -- potentiometer --; column 5, line 25, for "and" read -- or --; column 11, line 38, for "order" read -- orders --.

Signed and sealed this 16th day of June 1964.

(SEAL)
Attest:

ERNEST W. SWIDER
Attesting Officer

EDWARD J. BRENNER
Commissioner of Patents